Patented Oct. 6, 1931

1,826,224

UNITED STATES PATENT OFFICE

WILLI SCHULTZE, OF HALLE-ON-THE-SAALE, GERMANY

METHOD OF TREATING TALLOEL

No Drawing. Application filed November 29, 1927, Serial No. 237,329, and in Germany December 4, 1926.
Renewed August 6, 1931.

This invention relates to processes of treating talloel and it comprises a process in which talloel is distilled under very low pressure, that is, high vacuum, in order to separate components of the talloel.

Talloel is a by-product obtained in the soda process of treating wood for the production of cellulose fibers and varies in its composition according to the kind of wood. The talloel contains on the average about 30 to 50% of liquid fatty acids and 6 to 10% unsaponifiable substances mostly hydrocarbons, the remainder of the talloel being resinic acid.

It is known in the present state of the art to distil talloel in a vacuum, if desired with the employment of steam, for the purpose of splitting up talloel into its two chief constituents, fatty acid and resinic acid. These known methods however have the disadvantages that in the first place the content of unsaponifiable matter is not reduced by the distillation, and is even increased in some cases, and secondly that there is still a considerable amount of resinic acids in the distillate, in most cases over 30%, so that therefore with these two methods the separation is only obtained to a highly incomplete extent.

It is an object of the present invention to avoid the above disadvantages and to devise a process which will permit of separating the liquid fatty acids from the unsaponifiable matter and resinic acids in such fashion that the liquid fatty acids obtained are practically free from unsaponifiable matter and resinic acids.

I have found that I can attain this object by treating the talloel in a high vacuum, that means, 8 millimeters to 0 mm. mercury column in the absence of steam and other foreign vapors or gases. The reduction of the content of resinic acid can be further promoted by employing high vacuum apparatus with one or more fractionating columns.

Example

The talloel is distilled at a pressure of about 4 mm. or less. When it is found that the resinic acid begins to distil, the process is interrupted. At this moment the components of the talloel are separated with a completeness which has hitherto never been attainable in industry. The distillate obtained in this way only contains a very small quantity of unsaponifiable matter such as hydrocarbons, for instance 3% and resinic acid amounting to about 5%.

The temperature during the distillation depends somewhat upon the composition of the talloel, and the pressure used. The liquid fatty acids usually distill over around 180° C. to 210° C. under the very low pressure employed. The distillate obtained is light yellow in color and consists mostly of oleic acids and isomeric oleic acids, with but little resinic acid and unsaponifiable matter.

Having now particularly described and ascertained the nature of my said invention and in what manner the same is to be performed, I declare that,

What I claim is:—

1. The process of decomposing talloel to obtain the liquid fatty acids therefrom substantially free of resinic acid which comprises distilling talloel at a decomposing temperature in high vacuum, which means a vacuum of 8 millimeters mercury column or less in the absence of steam and foreign gases, until the first traces of resinic acid begin to come over and then discontinuing the distillation so as to obtain a distillate substantially free of resinic acid.

2. The process of decomposing talloel to obtain the liquid fatty acids therefrom substantially free of resinic acid which comprises distilling talloel at a decomposing temperature under an absolute pressure of about 4 millimeters until the first traces of resinic acid begin to come over and then discontinuing the distillation so as to obtain a distillate substantially free of resinic acid.

In testimony whereof I have signed my name to this specification.

Dr. WILLI SCHULTZE.